United States Patent
Lee et al.

(10) Patent No.: US 8,689,757 B2
(45) Date of Patent: Apr. 8, 2014

(54) BELT DRIVEN ELECTRIC STARTER SYSTEM

(75) Inventors: Jongwon Lee, Gunpo-si (KR); Hyounghyoun Kim, Hwaseong-si (KR)

(73) Assignees: Hyundai Motor Company, Seoul (KR); Kia Motors Company, Seoul (KR)

( * ) Notice: Subject to any disclaimer, the term of this patent is extended or adjusted under 35 U.S.C. 154(b) by 182 days.

(21) Appl. No.: 13/298,091

(22) Filed: Nov. 16, 2011

(65) Prior Publication Data
US 2013/0008401 A1    Jan. 10, 2013

(30) Foreign Application Priority Data

Jul. 4, 2011 (KR) .................... 10-2011-0065807

(51) Int. Cl.
*F02N 11/00* (2006.01)
*F16H 7/14* (2006.01)

(52) U.S. Cl.
USPC ........................ 123/179.25; 474/114

(58) Field of Classification Search
USPC ............. 123/179.25, 179.4, 198 R; 474/109, 474/113, 114, 115
See application file for complete search history.

(56) References Cited

U.S. PATENT DOCUMENTS

| | | | |
|---|---|---|---|
| 5,085,199 A * | 2/1992 | Sado et al. | 123/559.1 |
| 6,162,141 A | 12/2000 | Rointru et al. | |
| 6,817,328 B2 * | 11/2004 | Buglione et al. | 123/179.25 |
| 6,991,570 B2 * | 1/2006 | Serkh | 474/113 |
| 7,194,994 B1 * | 3/2007 | Chisenhall et al. | 123/195 A |
| 8,002,653 B2 * | 8/2011 | Shiozaki et al. | 474/8 |
| 8,162,786 B2 * | 4/2012 | Lang et al. | 474/114 |
| 8,166,945 B2 * | 5/2012 | Spicer et al. | 123/179.28 |
| 8,408,188 B1 * | 4/2013 | Hormilla | 123/559.1 |
| 2002/0039945 A1 * | 4/2002 | Ali et al. | 474/135 |

FOREIGN PATENT DOCUMENTS

| | | |
|---|---|---|
| JP | 10132041 A | 5/1998 |
| JP | 2005-299503 A | 10/2005 |
| KR | 100232453 B1 | 9/1999 |
| KR | 1020050038957 A | 4/2005 |
| KR | 20050042218 A | 5/2005 |
| KR | 10-2005-0065546 A | 6/2005 |
| KR | 20050111577 A | 11/2005 |
| WO | WO 2004/027289 A1 | 4/2004 |

* cited by examiner

*Primary Examiner* — Stephen K Cronin
*Assistant Examiner* — Elizabeth Hadley
(74) *Attorney, Agent, or Firm* — Morgan, Lewis & Bockius LLP (57) ABSTRACT

A Belt Driven Electric Starter System (BES) may have an idle pulley is composed of pivot point idle pulley forming pivot points at both sides of driving belt, which is wound on starter generator pulley and crank pulley, and driven idle pulley forming the fixing point, and a side of tension controller is fixed to engine and the opposite side is fixed to starter generator combined with starter generator pulley, such that it is possible to more effectively use the empty space without interference with the other portions in the entire layout of the BES. Further, excessive tension of driving belt due to starter generator when the engine is started can be attenuated by retraction of tension controller that moves with starter generator, while the excessive tension of driving belt due to crank pulley when electricity is generated can also be attenuated by extension of tension controller that moves with starter generator.

9 Claims, 7 Drawing Sheets

BELT DRIVEN ELECTRIC STARTER SYSTEM

CROSS-REFERENCE TO RELATED APPLICATIONS

The present application claims priority of Korean Patent Application Number 10-2011-0065807 filed Jul. 4, 2011, the entire contents of which application is incorporated herein for all purposes by this reference.

BACKGROUND OF INVENTION

1. Field of Invention

The present invention relates to a vehicle with an Idle Stop and Go (ISG) function, and more particularly, to a belt-driven electric starter system that can improve fuel efficiency by optimally adjusting a tension of a belt for engine's auxiliary components and improve durability with reduction of a noise.

2. Description of Related Art

In general, a belt-driven electric starter system for auxiliary components of an engine can contribute to improving fuel efficiency and NVH in accordance with the layout.

In particular, the layout of Belt driven electric starter system (BES) is considered as a very important factor in improving fuel efficiency and Noise, Vibration, and Harshness (NVH) in diesel engines of vehicles.

The BES has a layout in which a water pump pulley, an alternator pulley, and crank pulley, and an air-con pulley are connected by a belt around the crank pulley that takes the power of an engine while an idle pulley and a tension controller are disposed at the belt, such that belt tension is adjusted.

Figure 6A:
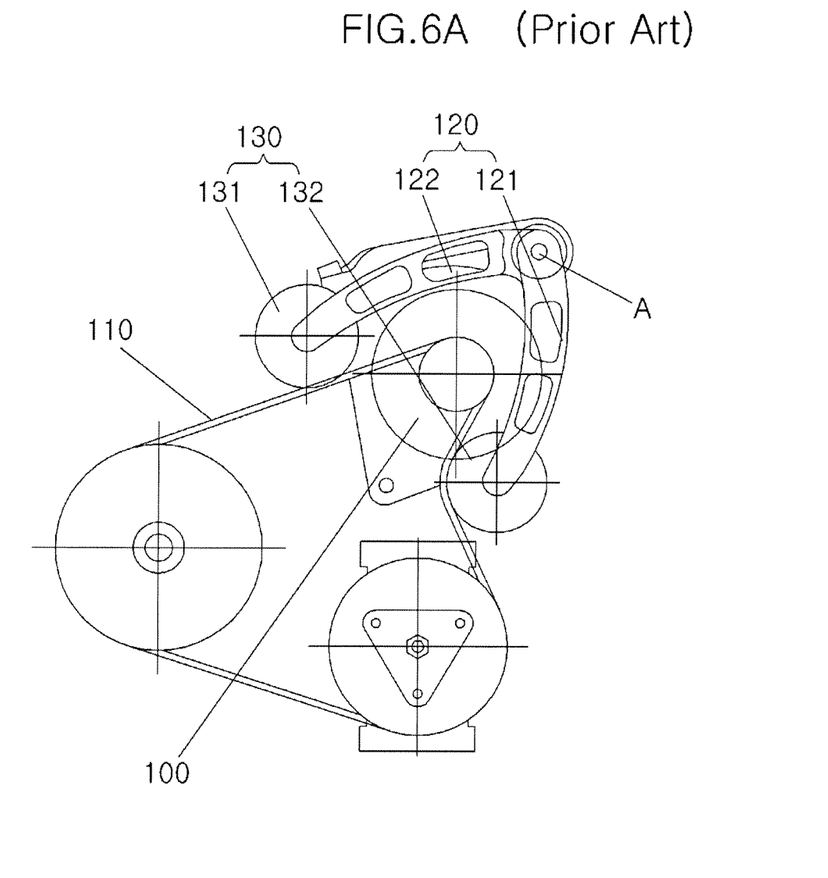
FIGS. 6A and 6B are views showing a partial configuration of a belt driven electric starter system of the related art.
Figure 6B:
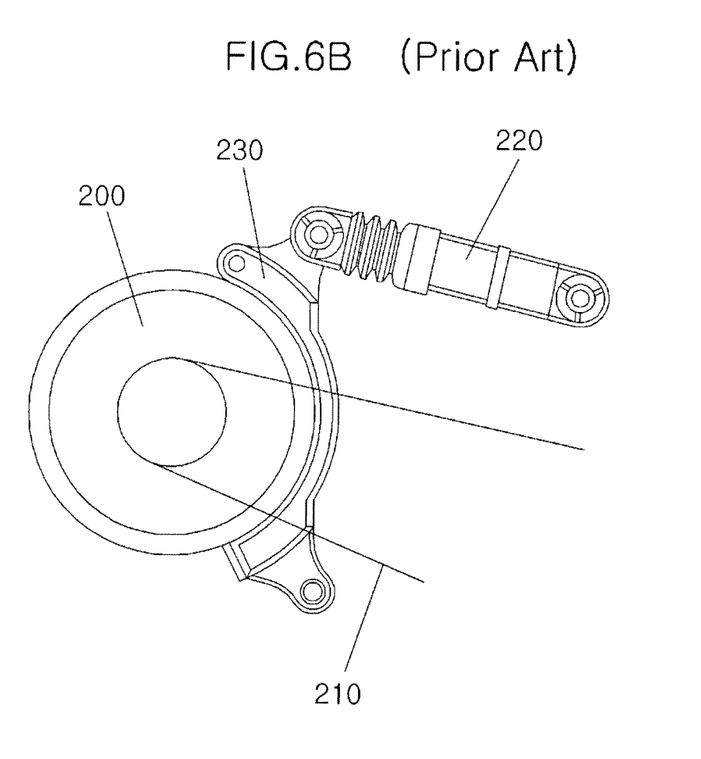

FIGS. 6A and 6B are views showing the configuration of a tension control system of a common BES.

The tension control system shown in FIG. 6A includes an idle pulley 130 composed of a pair of first and second idle pulleys 131 and 132 disposed at both sides of a belt 110 wound on an alternator pulley 100 and a tension controller 120 composed of a pair of first and second lever arms 121 and 122 fixed to first and second idle pulleys 131 and 132, respectively.

In the configuration, tension controller 120 makes on pivot point A when adjusting tension of belt 110, using idle pulley 130, and pivot point A is defined at a portion where first and second lever arms 121 and 122 are hinged.

However, since two lever arms, first and second lever arms 121 and 122, are fixed at one pivot point A in the tension control system, it is very difficult to implement a layout due to a limit in space.

Further, the structure of the tension control system is complicated even in a limited space, such that durability is necessarily low, because it is required to apply a tension and an attenuation force of a spring, which are applied to idle pulley 130 to adjust tension of belt 110, in both directions in respect to one pivot point A.

Different from the tension control system shown in FIG. 6A, the tension control system shown in FIG. 6B includes a friction plate 230 generating a friction force on an alternator pulley 200 where a belt 210 is wound and one tension controller 220 adjusting a friction force by pushing friction plate 230 with alternator pulley 200.

However, the tension control system shown in FIG. 6B is likely to cause excessive sliding of belt 210 due to insufficient winding angle of alternator pulley 200 in the start of an engine, which requires large driving force. It may also greatly decrease durability from adjusting the tension of belt 210 using the friction force on alternator pulley 200 by pushing friction plate 230 with tension controller 220. In addition, it generates a noise.

In particular, an increase in wear due to sliding of belt 210 reduces transmitted driving force, and if excessive, driving force that is large enough to start the engine may not be transmitted.

A variable pulley where a belt is wound with a variable height has been disclosed in Korean Patent Application Laid-Open No. 10-2005-0038957 (2006 Apr. 29) (see FIGS. 1 to 5, lines 24-44 on page 2 and lines 1-9 on page 3).

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a belt driven electric starter system that can easily transmit large driving force for operating an engine even with one tension control system by moving a starter generator when adjusting tension of a belt, and can remove difficulty in implementing a layout due to a limited space.

Various features of exemplary belt driven electric starter systems include a starter generator fixed to a hinge point formed at an engine; two or more idle pulleys fixed a pulley inlet and a pulley outlet of the starter generator; and a tension controller rotatably fixed to the starter generator and the engine and extended or retracted by a force from a driving belt wound on a crank pulley fitted on a crankshaft of the engine.

The tension controller extends or retracts in accordance with movement of the starter generator and the starter generator is fastened with the two idle pulleys, and a pivot point idle pulley that is one of the two idle pulleys is positioned lower than a driven idle pulley that is the other one to function as a pivot point for the movement of the starter generator.

The pivot point idle pulley and the driven idle pulley are positioned between the crank pulley and the starter generator pulley.

The tension controller has an arrangement in which the fastening point of the starter generator is positioned at an angle lower than the fastening point of the engine.

The starter generator pulley is equipped with a built-in on/off clutch.

The belt driven electric starter system further includes: an air-con pulley disposed with the crank pulley with respect to the crank pulley; a water pump pulley disposed with the crank pulley; and a driven belt wound on the crank pulley and the air-con pulley, unlike the driving pulley wound on the crank pulley, the water pump pulley, and the starter generator pulley.

A base plate is combined with the engine, on the base plate, in respect to a water pump seat where the water pump pulley is positioned, a starter generator seat where the starter generator pulley is positioned is formed at a portion of the edge of one side of the water pump seat, a crank pulley seat that is a space where the crank pulley is positioned is formed under the water pump seat, a space where the air-con pulley is positioned is formed at a side of the crank pulley seat, and a tension controller seat where a portion of the tension controller is fastened is formed above the water pump seat.

A pivot point forming end for fastening the pivot point idle pulley and the driven idle pulley and a pulley fixing end positioned higher than the pivot point forming end are formed at the starter generator seat, the starter generator with the starter generator pulley is fastened by the pivot point forming end and the pulley fixing end, and the pivot point forming end where the starter generator and the pivot point idle pulley are fastened functions as a pivot point for movement of the starter generator for extending or retracting the tension controller of which a portion is fixed to the tension controller seat.

The starter generator is fastened to the pivot point forming end, the pulley fixing end, and the tension controller by a housing portion.

According to various aspects of the present invention, it is possible to easily transmit large driving force for operating an engine only with one tension control system by adjusting tension of a belt, by connecting movement of a starter generator with the tension control system, and particularly, remove difficulty in implementing a layout due to a limited space, only with one tension control system.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
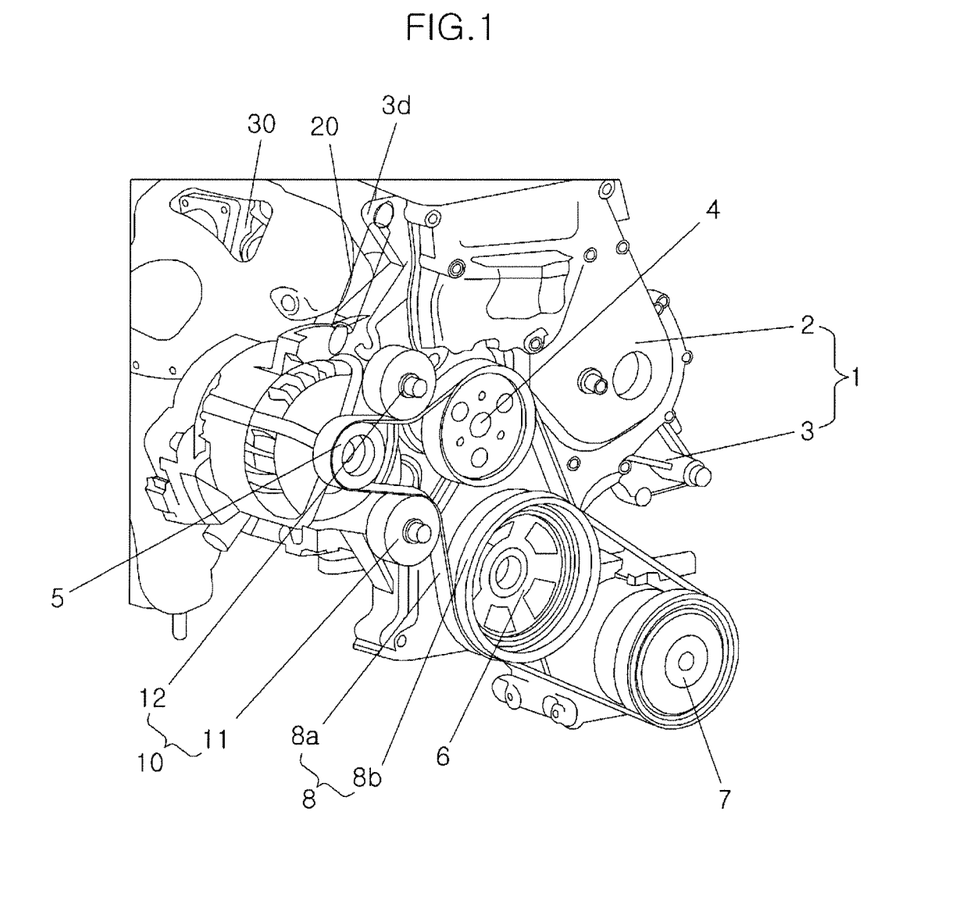
FIG. 1 is a view showing the configuration of an exemplary belt driven electric starter system according to the present invention.

Referring to FIG. 1, an exemplary Belt Driven Electric Starter System (BES) includes an engine plate 1 that is attached to an engine 30, a pulley unit arranged with a predetermined layout at engine plate 1 with respect to a crank pulley 6 fitted on the crankshaft of the engine, a belt 8 transmitting power of crank pulley 6 to the pulley unit, and a tension control unit preventing excessive sliding of belt 8 by adjusting tension of belt 8 in the start of the engine requiring large driving force or in generation of electricity.

Engine plate 1 has a base plate 3 covered with a cover plate 2 and the arrangement of the pulley unit is implemented in the layout formed on base plate 3.

The pulley unit is composed of a water pump pulley 4 positioned above crank pulley 6, a starter generator pulley 5 positioned at an upper side of crank pulley 6 at a predetermined distance from water pump pulley 4, and an air-con pulley 7 positioned at a lower side of crank pulley 6, when seen with respect to crank pulley 6 fitted on the crankshaft of the engine.

In this configuration, starter generator pulley 5 is equipped with a built-in on/off clutch, such that it can adjust an electricity generation state and a stop state of the starter generator.

Belt 8 is composed of a driving belt 8a and a driven belt 8b. Driving belt 8a is wound on crank pulley 6, water pump pulley 4, and starter generator pulley 5 and adjust tension with an idle pulley 10, while driven belt 8b is wound on crank pulley 6 and air-con pulley 7.

The tension control unit includes idle pulley 10 composed of a pair of pivot point idle pulley 11 and driven idle pulley 12, which are freely rotatably combined with base plate 3 of engine plate 1, and a tension controller 20 that extends/retracts to adjust tension of driving belt 8a wound on starter generator pulley 5 when the engine starts or electricity is generated.

Pivot idle pulley 11 of idle pulley 10 functions as a pivot point Pa, which is described below, unlike driven idle pulley 12. Tension controller 20 extends/retracts substantially straight.

Figure 2:
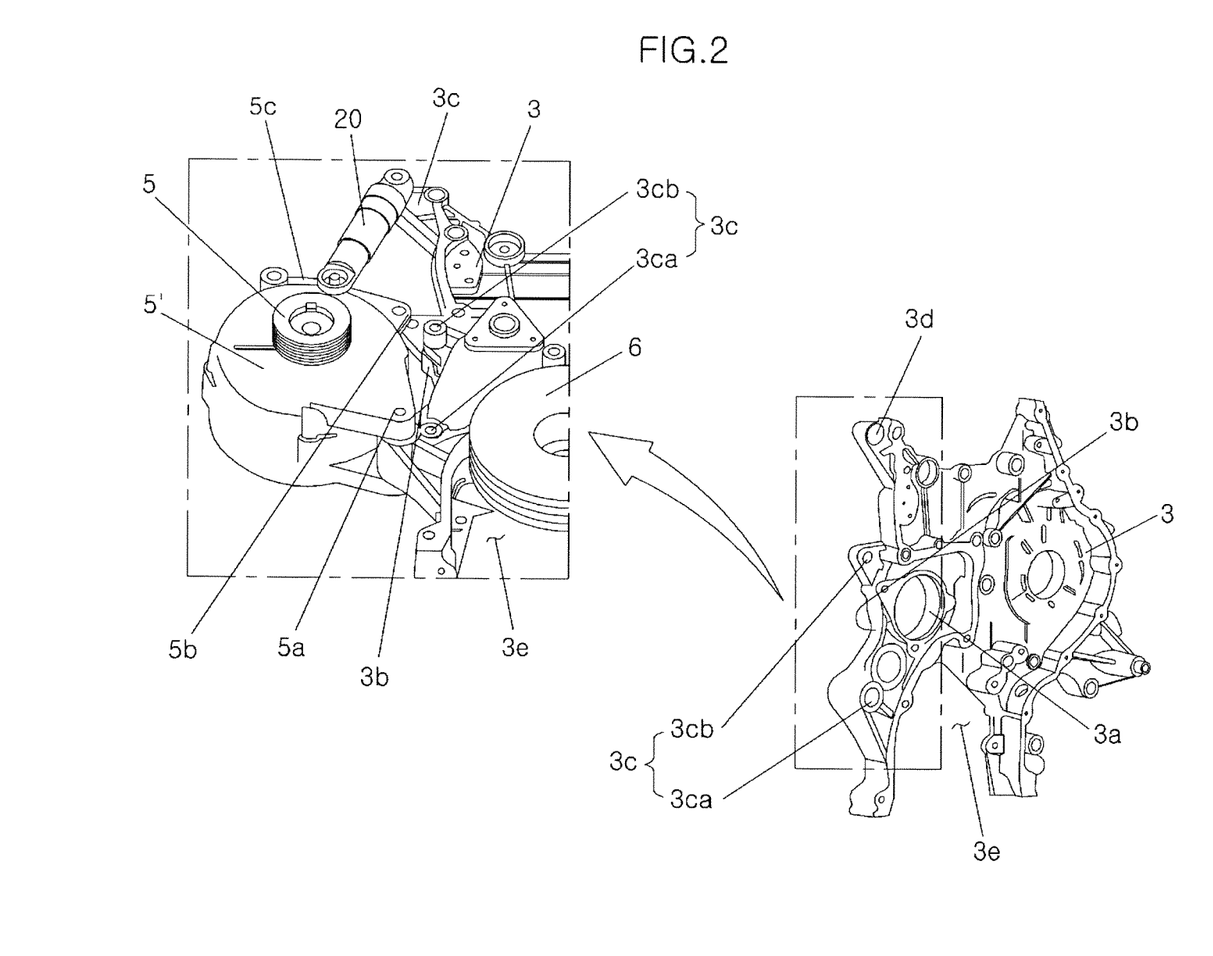
FIG. 2 is a view showing the configuration of an engine assembly for installing an exemplary belt driven electric starter system according to the present invention.

FIG. 2 shows an example of base plate 3 of the engine plate according to various embodiments of the present invention.

As shown in the figure, base plate 3 has a water pump seat 3a formed at a portion, a starter generator seat 3b at a side of water pump seat 3a, a crank pulley seat 3e under water pump seat 3a, and a space at a side of crank pulley seat 3e where air-con pulley 7 is positioned.

Water pump seat 3a is a hole formed in base plate 3, while starter generator seat 3b is formed in an arc shape surrounding a portion of a side of a starter generator 5', at the edge of a side of water pump seat 3a, and crank pulley seat 3e is a space surrounding crank pulley 6 at both side under water pump seat 3a.

An idle pulley seat 3c where idle pulley 10 adjusting belt tension is formed at base plate 3 and a tension controller seat 3d where tension controller 20 is fastened is further formed above idle pulley seat 3c.

Idle pulley seat 3c is composed of a pair of pivot point forming end 3ca and a pulley fixing end 3cb above and under starter generator seat 3b where starter generator pulley 5 is positioned, at predetermined distances, and pivot point forming end 3ca is positioned lower than pulley fixing end 3cb.

Pivot point forming end 3ca and pulley fixing end 3cb are bored such that bolts or hinge shaft can be fitted.

In various embodiments, starter generator pulley 5 positioned at starter generator seat 3b is provided at starter generator 5' and starter generator 5' is fastened together with pivot point idle pulley 11 and driven idle pulley 12 by idle pulley seat 3c formed at starter generator seat 3b.

For this configuration, pivot point forming end 3ca and pulley fixing end 3cb are fastened to starter generator 5', a pair of first and second fixing ends 5a and 5b for being fixed to base plate 3 are formed, and the pair of first and second fixing ends 5a and 5b are formed by boring the portions extending from a housing of starter generator 5' to fit a bolt or a screw.

First fixing end 5a is fastened to pivot point forming end 3ca and second fixing end 5b is fastened to pulley fixing end 3cb and the combination structure of them allows rotation of starter generator 5' in accordance with extension and retraction of tension controller 20.

Tension control seat 3d is bored such that a bolt of a hinge shaft can be fitted, above idle pulley seat 3c and fixes a portion of tension controller 20.

In various embodiments, tension controller 20 keeps tension of driving belt 8a in the optimum state by extending or retracting with movement of starter generator 5' that is moved by starter generator pulley 5 receiving excessive tension of driving belt 8a when the engine is started or electricity is generated.

Therefore, a portion of tension controller 20 is fixed to base plate 3 through tension controller seat 3d and the other portion is fixed to starter generator 5' through tension controller fixing end 5c.

Tension controller fixing end 5c is formed by boring the portion extending from the housing of starter generator 5' to fit a bolt or a screw.

Figure 3:
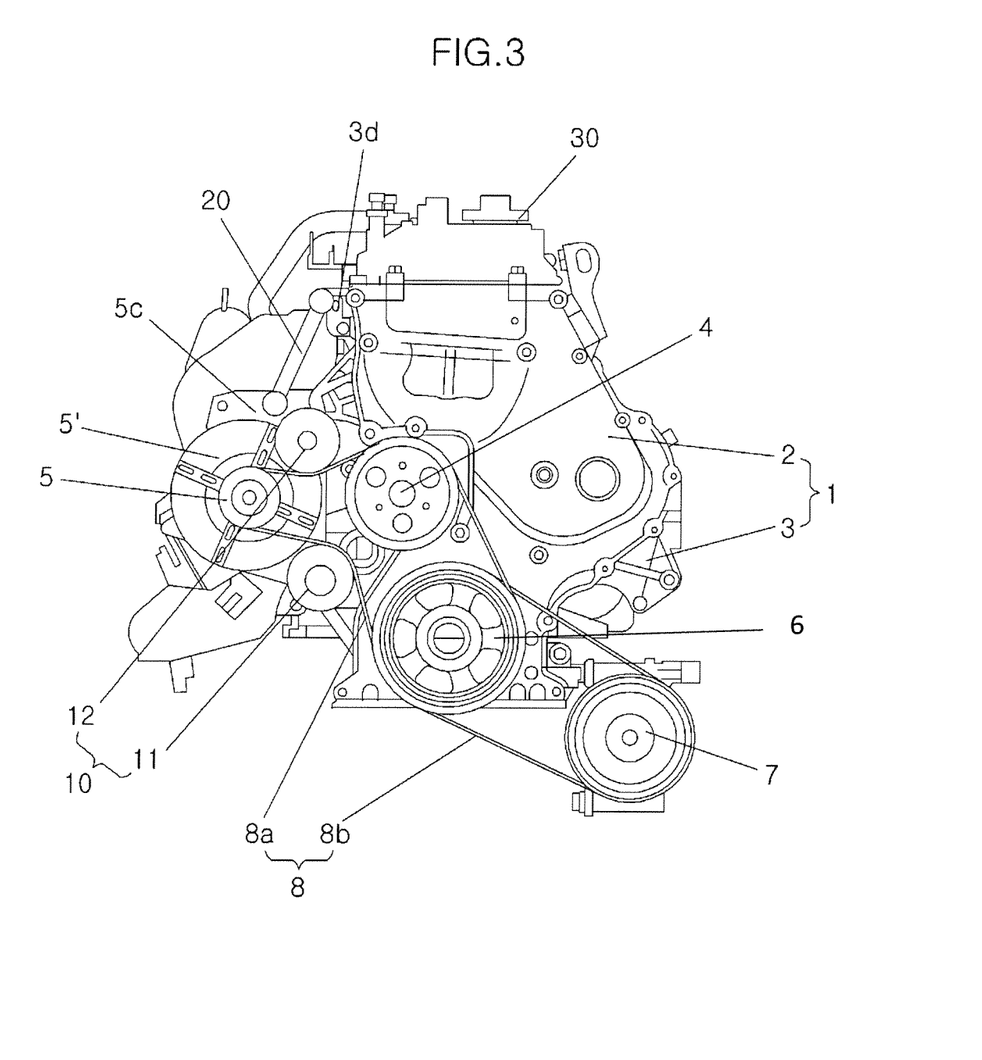
FIG. 3 is a view showing an exemplary layout of an engine equipped with an exemplary belt driven electric starter system according to the present invention.

FIG. 3 shows an exemplary layout of an engine equipped with an exemplary BES according to the present invention.

As shown in the figure, a pulley unit is positioned at a side space forming an upper portion higher than crank pulley 6 and another side space forming a lower portion, with respect to crank pulley 6 fitted on the crankshaft of the engine, driving belt 8a of belt 8 is wound on the pulley unit disposed at the upper space in respect to crank pulley 6 and driven belt 8b is wound on the pulley unit disposed at the lower space, and the tension control unit is composed of idle pulleys 10 positioned at both sides of driving belt 8a that is moved by tension controller 20 that extends or retracts when the engine is started or electricity is generated, thereby forming the entire layout of the BES.

According to the exemplary layout of the pulley unit, in respect to crank pulley 6 fitted on the crankshaft of the engine, water pump pulley 4 is positioned above crank pulley 6, starter generator pulley 5 is positioned at a side of crank pulley 6 at a predetermined distance from water pump pulley 4, and air-con pulley 7 is positioned at the opposite side of starter generator pulley 5, under crank pulley 6.

In this layout, crank pulley 6 is positioned at water pump seat 3a of base plate 3 of engine plate 1, water pump pulley 4 is positioned at water pump seat 3a, starter generator pulley 5 is positioned at starter generator seat 3b, and air-con pulley 7 is positioned at a space defined at a side of crank pulley seat 3e.

In the layout of belt 8, driving pulley 8a is wound on starter generator pulley 5 across water pump pulley 4 from crank pulley 6 and driven belt 8b is wound on air-con pulley 7 from crank pulley 6.

In the layout of idle pulley 10 of the tension control unit, in respect to idle pulley seat 3c of base plate 3 of engine plate 1, pivot point idle pulley 11 of idle pulley 10 is positioned at pivot point forming end 3ca of idle pulley seat 3c and driven idle pulley 12 is positioned at pulley fixing end 3cb of idle pulley seat 3c.

Therefore, pivot point idle pulley 11 freely rotates at an excessive tension side of driving belt 8a of belt 8 when the engine is started, while driven idle pulley 12 freely rotates at the excessive tension portion of driving belt 8a when electricity is generated.

Accordingly, it is possible to adjust the tension both in the start of the engine and generation of electricity in various embodiments.

In the layout of tension controller 20 of the tension control unit, a portion is fixed to tension controller seat 3d of base plate 3 of engine plate 1 and the opposite side is fixed to tension controller fixing end 5c at the housing of starter generator 5'.

As described above, since tension controller 20 has the arrangement with one side fixed to engine 30 and the opposite side is fixed to starter generator 5' where starter generator pulley 5 is combined, it can be installed by using an empty space without interference with other portions in the layout of BES.

One will appreciate that the above-mentioned layout is only exemplary. The arrangement of various pulleys, seats and other components is quite flexible.

Figure 4:
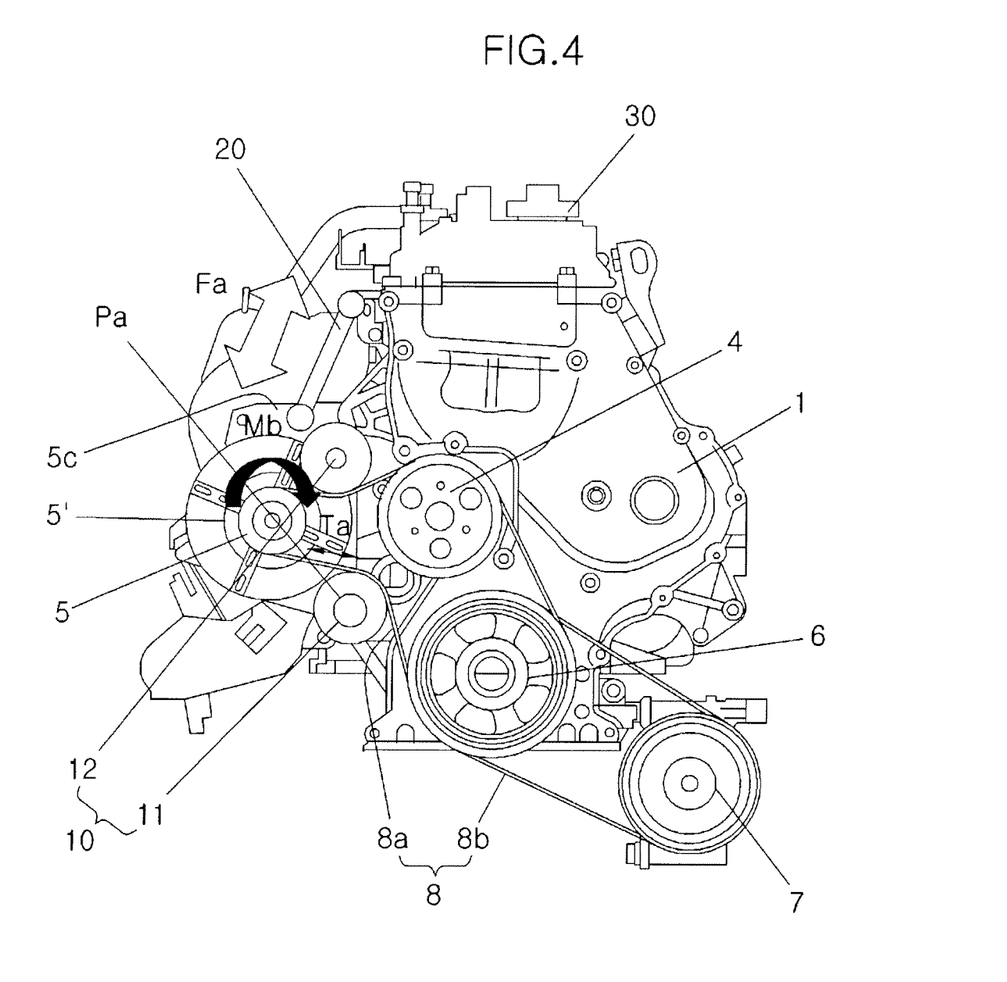
FIG. 4 is a view showing the operation when starting an engine equipped with an exemplary belt driven electric starter system according to the present invention.

FIG. 4 shows the operation when an engine equipped with an exemplary BES according to the present invention is started.

As shown in the figure, starter generator pulley 5 is rotated clockwise by rotation of starter generator 5' when the engine is started, such that excessive tension Ta is necessarily exerted in driving belt 8a at pivot point idle pulley 11.

As driving belt 8a is in contact with the outer circumferential surface of pivot point idle pulley 11, the force of the normal component of the force vector in excessive tension Ta exerted in driving belt 8a acts as a force pressing pivot point idle pulley 11 while the force of the tangential component acts as a force lifting starter generator pulley 5.

However, the force applied to starter generator pulley 5 is transmitted to starter generator 5' and starter generator 5' receiving the force makes clockwise rotation Ma about the axial center of pivot point idle pulley 11, which is a pivot point Pa.

The relationship of the action of the forces is caused because pivot point idle pulley 11 is positioned lower than starter generator pulley 5.

As driving belt 8a is pulled while being supported at pivot point idle pulley 11, the pulling force of driving belt 8a presses down pivot point idle pulley 11 that is the support point, but starter generator pulley 5 far from the support point is lifted.

Therefore, the movement of starter generator 5' that makes clockwise rotation Ma is transmitted to tension controller 20, such that tension controller 20 is retracted by an upward force Fa and the entire length reduces.

The reduction in length of tension controller 20 depends on a change in movement of starter generator 5'.

The movement due to clockwise rotation Ma of starter generator 5' is not stopped by the reduction in length of tension controller 20, such that the portion of driving belt 6a wound on starter generator 5' and positioned at pivot point idle pulley 11 is loosened, while the portion of driving belt 6a positioned at driven idle pulley 12 is tensed.

Therefore, tension can be uniformed exerted throughout driving belt 8a wound on starter generator pulley 5, water pump pulley 4, and crank pulley 6.

Figure 5:
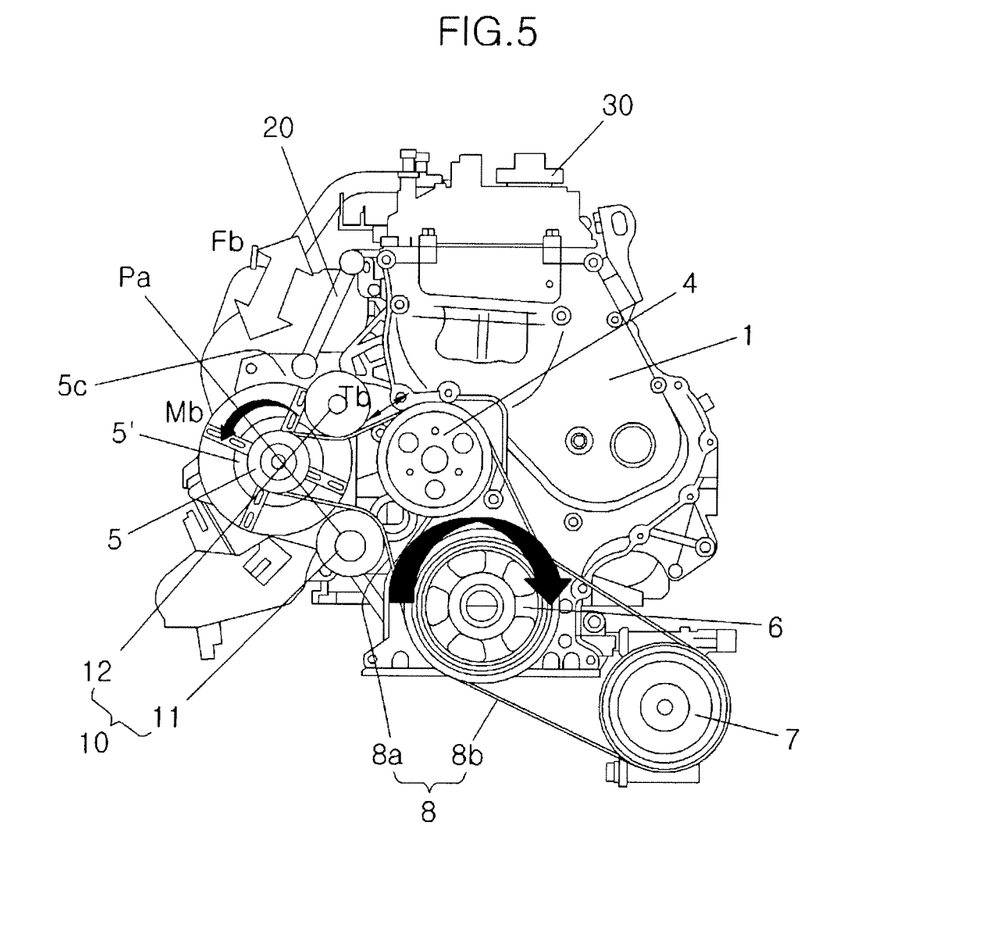
FIG. 5 is a view showing the operation when generating electricity in an engine equipped with an exemplary belt driven electric starter system according to the present invention.

FIG. 5 shows the operation when an engine equipped with the BES according to various embodiments generates electricity.

As shown in the figure, crank pulley 6 rotates clockwise when electricity is generated, unlike when the engine is started, such that excessive tension Tb is necessarily exerted in driving belt 8a at driven idle pulley 12.

As driving belt 8a is in contact with the outer circumferential surface of driven idle pulley 12, the force of the normal component of the force vector in excessive tension Tb exerted in driving belt 8a acts as a force pressing driven idle pulley 12 while the force of the tangential component acts as a force pressing down starter generator pulley 5.

However, the force applied to starter generator pulley 5 is transmitted to starter generator 5' and starter generator 5' receiving the force makes counterclockwise rotation Mb about the axial center of pivot point idle pulley 11, which is a pivot point Pa.

The relationship of the action of the forces is caused because driven idle pulley 12 is positioned higher than starter generator pulley 5.

As driving belt 8a is pulled while being supported at driven idle pulley 12, the pulling force of driving belt 8a presses down driven idle pulley 12 that is the support point while starter generator pulley 5 far from the support point is pressed down.

Therefore, the movement of starter generator 5' that makes counterclockwise rotation Mb is transmitted to tension controller 20, such that tension controller 20 is tensed by a downward force Fb and the entire length increases.

The increase in length of tension controller 20 depends on a change in movement of starter generator 5'.

The movement due to counterclockwise rotation Mb of starter generator 5' is not stopped by the increase in length of tension controller 20, such that the portion of driving belt 6a wound on starter generator 5' and positioned at driven idle pulley 12 is loosened, while the portion of driving belt 6a positioned at pivot point pulley 12 is tightly tensed.

Therefore, tension can be uniformed exerted throughout driving belt 8a wound on starter generator pulley 5, water pump pulley 4, and crank pulley 6.

As described above, a BES according to various embodiments has the layout in which idle pulley 10 is composed of pivot point idle pulley 11 forming pivot points Pa at both sides of driving belt 8a, which is wound on starter generator pulley 5 and crank pulley 6, and driven idle pulley 12 forming the fixing point, and a side of tension controller 20 is fixed to engine 30 and the opposite side is fixed to starter generator 5' combined with starter generator pulley 5.

Therefore, it is possible to more effectively use the empty space without interference with the other portions in the entire layout of the BES. Further, excessive tension of driving belt 8a due to starter generator 5' when the engine is started can be attenuated by retraction of tension controller 20 that moves with starter generator 5', while the excessive tension of driving belt 8a due to crank pulley 6 when electricity is generated can also be attenuated by extension of tension controller 20 that moves with starter generator 5'.

For convenience in explanation and accurate definition in the appended claims, the terms "upper" or "lower", "above" or "below", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A belt driven electric starter system comprising:
   a driving belt driven by a crankshaft of an engine;
   a starter generator affixed to a hinge point on the engine;
   two idle pulleys, one an inlet pulley guiding the belt to the starter generator, and another a outlet pulley guiding the belt from the starter generator, wherein a pivot point idle pulley that is the one of the two idle pulleys and a driven idle pulley that is the another of the two idle pulleys, are fastened together with the starter generator, and wherein the pivot point idle pulley functions as a pivot point for movement of the starter generator;
   a tension controller rotatably affixed to the starter generator and to the engine such that the tension controller extends and retracts in response to a force from the driving belt wound on a crank pulley fitted on the crankshaft of the engine; and
   a pivot point forming end for fastening the pivot point idle pulley; and
   a pulley fixing end fastening the driven idle pulley and being positioned higher than the pivot point forming end;
   wherein the pivot point forming end in which the starter generator and the pivot point idle pulley are fastened, functions as the pivot point for movement of the starter generator for extending and retracting the tension controller.

2. The belt driven electric starter system as defined in claim 1, wherein the tension controller extends or retracts in accordance with the movement of the starter generator, and
   the pivot point idle pulley is positioned lower than the driven idle pulley that is the another of the two idle pulleys.

3. The belt driven electric starter system as defined in claim 1, wherein the pivot idle pulley and the driven idle pulley are positioned between crank pulley and a starter generator pulley.

4. The belt driven electric starter system as defined in claim 2, wherein the tension controller fastened to the starter generator at a position lower than the tension controller is fastened to the engine.

5. The belt driven electric starter system as defined in claim 1, wherein a starter generator pulley is equipped with a built-in on/off clutch.

6. The belt driven electric starter system as defined in claim 1, further comprising:
   an air-con pulley is operably connected with crank pulley;
   a water pump pulley is operably connected with the crank pulley; and
   a driven belt operably connects the crank pulley and the air-con pulley, and the driving belt operably connects the crank pulley, the water pump pulley, and starter generator pulley.

7. The belt driven electric starter system as defined in claim 1, wherein the engine comprises a base plate including a water pump seat where a water pump pulley is positioned, a starter generator seat where a starter generator pulley is positioned to one side of the water pump seat, a crank pulley seat where a crank pulley is positioned under the water pump seat, a space where an air-con pulley is positioned formed to one side of the crank pulley seat, and a tension controller seat to which the tension controller is fastened above the water pump seat.

8. The belt driven electric starter system as defined in claim 7, wherein the starter generator seat has the pivot point forming end and the pulley fixing end, the starter generator with the starter generator pulley is fastened by the pivot point forming end and the pulley fixing end, and the tension controller seat fixes the tension controller to extend and retract by the movement of the starter generator.

9. The belt driven electric starter system as defined in claim 8, wherein the starter generator is fastened to the pivot point forming end, the pulley fixing end, and the tension controller by a housing portion.

* * * * *